US006664332B2

(12) United States Patent
Saeki

(10) Patent No.: US 6,664,332 B2
(45) Date of Patent: Dec. 16, 2003

(54) RESIN COMPOSITION FOR RECORDING SHEETS

(75) Inventor: Masaru Saeki, Ibaraki (JP)

(73) Assignee: The Nippon Synthetic Chemical Industry Co., Ltd. (JP)

( * ) Notice: Subject to any disclaimer, the term of this patent is extended or adjusted under 35 U.S.C. 154(b) by 0 days.

(21) Appl. No.: 10/199,230

(22) Filed: Jul. 17, 2002

(65) Prior Publication Data

US 2003/0040573 A1 Feb. 27, 2003

(30) Foreign Application Priority Data

Jul. 19, 2001 (JP) ....................................... 2001-218955

(51) Int. Cl.$^{7}$ ......................... C08L 29/04; C08L 33/24; C08L 33/26

(52) U.S. Cl. ........................... 525/57; 524/503; 525/56; 525/59

(58) Field of Search ........................... 524/503; 525/56, 525/57, 59

(56) References Cited

U.S. PATENT DOCUMENTS

| | | | | |
|---|---|---|---|---|
| 1,971,662 A | * | 8/1934 | Schmitd et al. | 525/56 |
| 2,936,263 A | * | 5/1960 | Hardt et al. | 424/462 |
| 3,033,841 A | * | 5/1962 | Germain | 525/56 |
| 3,064,911 A | * | 11/1962 | Truitt et al. | 242/470 |
| 3,106,543 A | * | 10/1963 | Miline | 525/57 |
| 3,114,650 A | * | 12/1963 | Oppenheim et al. | 152/524 |
| 3,218,281 A | * | 11/1965 | Rees | 524/457 |
| 3,346,530 A | * | 10/1967 | Martins | 524/375 |
| 4,369,281 A | * | 1/1983 | Zimmermann et al. | 524/379 |
| 4,618,648 A | * | 10/1986 | Marten | 525/60 |
| 4,636,805 A | * | 1/1987 | Toganoh et al. | 347/105 |
| 4,946,720 A | * | 8/1990 | Oishi et al. | 428/35.4 |
| 5,478,884 A | * | 12/1995 | Tomita et al. | 525/58 |
| 5,591,294 A | * | 1/1997 | Sakaki et al. | 156/250 |
| 5,824,462 A | * | 10/1998 | Ashida et al. | 430/531 |
| 5,912,085 A | * | 6/1999 | Ito et al. | 428/500 |

FOREIGN PATENT DOCUMENTS

| | | | |
|---|---|---|---|
| JP | 56152734 | * | 11/1981 |
| JP | 61010483 | | 1/1986 |
| JP | 62020505 A | * | 1/1987 |
| JP | 01056135 A | * | 3/1989 |
| JP | 4093301 A | * | 3/1992 |
| JP | 10309780 | | 11/1998 |
| JP | 2001-121814 | | 5/2001 |

* cited by examiner

*Primary Examiner*—Judy M. Reddick
(74) *Attorney, Agent, or Firm*—Ware, Fressola, Van Der Sluys & Adolphson LLP

(57) ABSTRACT

A resin composition suitable for forming ink receptive layer of recording sheets and having excellent ink receptivity, feathering prevention, gloss and weatherability, which comprises (A) an oxyalkylene group-containing polyvinyl alcohol resin and (B) a cationic group-containing polyvinyl alcohol resin, wherein a 15% by weight aqueous solution of the resin composition has a transparency according to JIS K 6726 of at least 50%.

5 Claims, No Drawings

RESIN COMPOSITION FOR RECORDING SHEETS

BACKGROUND OF THE INVENTION

The present invention relates to a resin composition for recording papers or sheets to be printed by ink jet method, offset printing method, flexographic printing method, heat-sensitive recording method and the like. More particularly, the present invention relates to a resin composition suitable for forming an ink receptive layer of recording papers or sheets, which has excellent printability such as ink receptivity, feathering prevention, gloss and weatherability.

Heretofore, for the purpose of improving the printability of recording sheets for ink jet printing, offset printing, flexographic printing, heat-sensitive recording or the like, it has been tried to provide a particular coating layer (ink receptive layer) on the surface of the sheet substrates.

For example, (1) JP-A-61-10483 discloses using a cation-modified polyvinyl alcohol in the coating layer for the purpose of improving ink receptivity and sharpness of recorded images; (2) JP-A-10-309780 discloses using an alkyleneoxide-modified polyvinyl alcohol resin in the coating layer for the purpose of improving ink absorption, water resistance, resolution of images and blocking resistance; and (3) JP-A-2001-121814 discloses using a composition comprising an acrylic copolymer having a crosslinkable group and a polyvinyl alcohol resin for forming the coating layer for the purpose of improving uniformity and sharpness of images, and water resistance.

However, as a result of detail review of these publications, it has been found that further improvement in gloss and weatherability is desired in proposal (1), that feathering may occur in the coating layer to deteriorate the image stability in proposal (2), and that further improvement in gloss and weatherability is desired in proposal (3). Accordingly, there is a demand for a coating resin composition excellent in all of ink receptivity, feathering prevention property, gloss and weatherability.

An object of the present invention is to provide a resin composition for recording sheets, which has excellent printability in respect of ink receptivity, feathering prevention property, gloss, weatherability and the like.

A further object of the present invention is to provide a resin composition suitable for production of recording sheets for ink jet printing, offset printing, flexographic printing, heat-sensitive recording or the like, and applicable to not only paper substrate but also plastic substrates to form the ink receptive layer thereon.

Another object of the present invention is to provide a recording sheet having excellent ink receptivity, feathering prevention property, gloss, weatherability or the like.

These and other objects of the present invention will become apparent from the description hereinafter.

SUMMARY OF THE INVENTION

It has now been found that recording sheets having excellent properties such as ink receptivity, feathering prevention property, gloss and weatherability can be obtained when an ink receptive layer is formed on recording sheet substrates from a coating composition prepared by using an oxyalkylene group-containing polyvinyl alcohol resin (A) and a cationic group-containing polyvinyl alcohol resin (B) in combination so that a solution of a mixture of the resins (A) and (B) dissolved in water in a concentration of 15% by weight has a transparency of at least 50% measured according to JIS K 6726.

Thus, in accordance with the present invention, there is provided a resin composition for recording sheets, comprising (A) a polyvinyl alcohol resin containing oxyalkylene groups and (B) a polyvinyl alcohol resin containing cationic groups, wherein a 15% by weight aqueous solution of the mixture of said resin (A) and said resin (B) has a transparency of not less than 50% measured according to JIS K 6726.

DETAILED DESCRIPTION

The oxyalkylene group-containing polyvinyl alcohol resin (A) used in the present invention includes polyvinyl alcohol resins containing an oxyalkylene group of the formula (1):

(1)

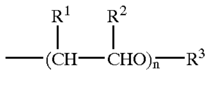

wherein $R^1$ and $R^2$ are a hydrogen atom or an alkyl group (particularly methyl group or ethyl group), $R^3$ is a hydrogen atom, an alkyl group or an alkylamide group, and n is a positive integer.

The oxyalkylene group-containing polyvinyl alcohol resin (A) can be obtained, for instance, by copolymerizing a vinyl ester compound with an unsaturated monomer having oxyalkylene group (1) and hydrolyzing the resulting copolymer.

The unsaturated monomers having oxyalkylene group (1) include, for instance, the following compounds, but are not limited thereto in the present invention.

(Meth)acrylic Acid Esters

There are mentioned monomers of the following formula (2), examples of which are polyoxyethylene (meth)acrylate, polyoxypropylene (meth)acrylate and the like:

(2)

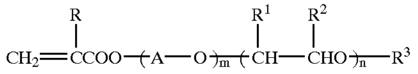

wherein R is a hydrogen atom or a methyl group, $R^1$ and $R^2$ are independently a hydrogen atom or an alkyl group, $R^3$ is a hydrogen atom, an alkyl group or an alkylamide group, A is an alkylene group, a substituted alkylene group, a phenylene group or a substituted phenylene group, m is 0 or an integer of not less than 1, n is an integer of 1 to 100.

(Meth)acrylamides

There are mentioned monomers of the following formula (3), examples of which are polyoxyethylene(meth) acrylamide, polyoxy-propylene(meth)acrylamide, polyoxyethylene(1-(meth)acrylamide-1,1-dimethylpropyl) ester and the like:

(3)

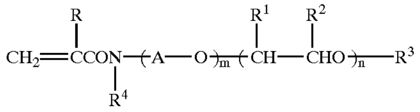

wherein A, R, $R^1$, $R^2$, $R^3$, m and n are as defined above, and $R^4$ is a hydrogen atom, an alkyl group or a group of the following formula (4):

(4)

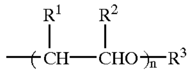

wherein $R^1$, $R^2$ and $R^3$ are as defined above, and n is an integer of 1 to 300.

(Meth)allyl Alcohols

There are mentioned monomers of the following formula (5), examples of which are polyoxyethylene (meth)allyl ether, polyoxypropylene (meth)allyl ether and the like.

(5)

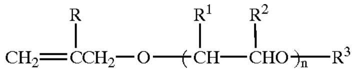

wherein R, $R^1$, $R^2$, $R^3$ and n are as defined above.

Vinyl Ethers

There are mentioned monomers of the following formula (6), examples of which are polyoxyethylene vinyl ether, polyoxypropylene vinyl ether and the like:

(6)

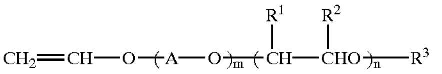

wherein A, $R^1$, $R^2$, $R^3$, m and n are as defined above.

Of these unsaturated monomers containing oxyalkylene group, (meth)allyl alcohol compounds (5) are preferably used.

Polyoxyalkylene allylamines such as polyoxyethylene allylamine and polyoxypropylene allylamine, and polyoxyalkylene vinylamines such as polyoxyethylene vinylamine and polyoxypropylene vinylamine, can also be used.

The oxyalkylene group-containing unsaturated monomers may be used alone or in admixture thereof.

Examples of the vinyl ester compounds to be copolymerized with the oxyalkylene group-containing unsaturated monomers are, for instance, vinyl formate, vinyl acetate, vinyl trifluroacetate, vinyl propionate, vinyl butyrate, vinyl caprate, vinyl laurate, vinyl myristate, vinyl palmitate, vinyl stearate, vinyl pivalate, and the like. These may be used alone or in admixture thereof. Vinyl acetate is preferred in practical use.

Upon the copolymerization of vinyl esters and oxyalkylene group-containing monomers, the polymerization method is not particularly limited, and known polymerization methods can be suitably used. A solution polymerization using an alcohol such as methanol, ethanol or isopropanol as a solvent is usually practiced. Emulsion polymerization and suspension polymerization are also of course adoptable. As to a manner of charging monomers in such a solution polymerization, any manners can be used, e.g., a manner wherein first the whole amount of a vinyl ester and a part of an oxyalkylene group-containing unsaturated monomers are charged in a reactor and the polymerization is started, and the remaining monomer is then continuously, intermittently or stepwise added during the polymerization period, and a manner wherein monomers are added at one time in the initial stage of the polymerization. The copolymerization reaction is carried out by using known polymerization catalysts such as radical polymerization catalysts and low-temperature active catalysts, e.g., azobisisobutyronitrile, acetyl peroxide, benzoyl peroxide and lauroyl peroxide. The reaction temperature is selected from the range between about 35° C. and the boiling point of a solvent.

The obtained copolymers are then hydrolyzed. The hydrolysis is carried out by known methods. Both alkali hydrolysis and acid hydrolysis can be adopted, but in case of industrial production, the copolymer is dissolved in an alcohol solvent and hydrolyzed in the presence of an alkali catalyst. Examples of the alcohol are, for instance, methanol, ethanol, isopropanol, butanol and the like. The concentration of the copolymer in the alcohol solution is selected from 20 to 50% by weight. The alcohol solvent may contain water in an amount of about 0.3 to about 10% by weight based on the total weight of alcohol and water. Also, for the purpose of control of dielectric constant of the solvent in hydrolysis, various solvents, e.g., esters such as methyl acetate, benzene, hexane and DMSO (dimethyl sulfoxide), may be added to the alcohol solution.

The hydrolysis catalyst includes alkali catalysts, e.g., hydroxides and alcoholates of alkali metals such as sodium hydroxide, potassium hydroxide, sodium methylate, sodium ethylate and potassium methylate. The amount of such a catalyst is preferably from 1 to 100 millimolar equivalents based on the vinyl ester compound.

The copolymers of vinyl esters and oxyalkylene group-containing monomers are partially or completely hydrolyzed to provide oxyalkylene group-containing polyvinyl alcohol resins (A).

In the present invention, it is preferable that the content of oxyalkylene group in the resin (A) is from 0.1 to 30% by mole, especially from 0.5 to 25% by mole, more especially from 1.0 to 20% by mole. If the content of oxyalkylene group is less than 0.1% by mole, the ink receptivity of recording sheets tends to deteriorate or the feathering tends to easily occur. If the content is more than 30% by mole, the weatherability and water resistance of recording sheets tend to deteriorate.

The degree of hydrolysis (of the vinyl ester component, e.g., vinyl acetate component) of the oxyalkylene group-containing polyvinyl alcohol resins (A) is not particularly limited, but preferably the degree of hydrolysis is from 50 to 100% by mole, especially from 70 to 100% by mole. If the degree of hydrolysis is less than 50% by mole, the ink receptivity and weatherability tend to deteriorate.

The degree of polymerization of the resin (A) is also not limited, but preferably the average degree of polymerization is from 50 to 3,000, especially from 100 to 2,500. If the average degree of polymerization is less than 50, the film-forming property is poor, so recording sheets may cause blocking since stickiness remains on the coated surface of recording sheets. If the average degree of polymerization is more than 3,000, the viscosity of a coating solution to prepare the recording sheets raises too high, so the workability is deteriorated or the coated surface does not become flat and smooth.

Cationic group-containing polyvinyl alcohol resins (B) used in the present invention are obtained by hydrolyzing copolymers of unsaturated monomers having a cationic group and vinyl ester compounds as mentioned above in the same manner as above.

Examples of the unsaturated monomers having a cationic group are, for instance, trimethyl-(methacrylamide)-ammonium chloride, 2,3-dimethyl-1-vinylimidazolinium chloride, dimethyldiallylammonium chloride, (meth) acrylamidealkyltrialkylammonium salts such as trimethyl-(3-acrylamide-3-dimethylpropyl)-ammonium chloride, 3-acrylamidepropyltrimethylammonium chloride and 3-methacrylamidepropyltrimethylammonium chloride, a quaternary ammonium salt of N-(3-allyloxy-2-hydroxypropyl)dimethyl amine, quaternary ammonium salts of acrylamide, methacrylamide and their derivatives such as N-methylacrylamide, N-ethylacrylamide, N,N-dimethylacrylamide, diacetoneacrylamide, N-methylolacrylamide, N-methylmethacrylamide, N-ethylmethacrylamide and N-methylolmethacrylamide, (meth)acryloyloxyalkyltrialkylammonium salts such as acryloyoxyethyltrimethylammonium chloride and methacryloyloxyethyltrimethylammonium chloride, and the like.

It is preferable that the content of cationic group in the cationic group-containing polyvinyl alcohol resin (B) is from 0.3 to 10% by mole, especially from 0.5 to 8% by mole. If the content of cationic group is less than 0.3% by mole, the image stability, water resistance and resolution are deteriorated. If the content of cationic group is more than 10% by mole, the adhesion between the formed film and the substrate of recording sheets or the weatherability tends to lower.

The degree of hydrolysis (of the vinyl ester component, e.g., vinyl acetate component) of the cationic group-containing polyvinyl alcohol resins (B) is not particularly limited, but it is preferable by the same reasons as the polyvinyl alcohol resin (A) that the degree of hydrolysis is from 50 to 100% by mole, especially from 70 to 100% by mole.

The degree of polymerization of the resin (B) is also not limited, but it is preferable by the same reasons as the polyvinyl alcohol resin (A) that the average degree of polymerization is from 50 to 3,000, especially from 100 to 2,500.

The resin composition of the present invention comprises the resin (A) and the resin (B) as mentioned above. It is further required that a 15% by weight aqueous solution of the resin composition has a transparency of at least 50%, preferably at least 60%, when the resin composition is composed of only the resins (A) and (B). If the transparency is less than 50%, the objects of the present invention cannot be achieved.

The term "transparency" as used herein means a value measured according to JIS K 6726 with respect to a solution of the resin composition dissolved in water in a concentration of 15% by weight.

The manner of adjusting the transparency of 15% by weight aqueous solution of the resin composition to 50% or more is not particularly limited. The transparency of 50% or more can be achieved, for instance, (1) by adjusting the content of oxyalkylene group in the resin (A) within the range of 0.2 to 30% by mole, (2) by adjusting the content of cationic group in the resin (B) within the range of 0.3 to 10% by mole, (3) by adjusting the difference in degree of hydrolysis between the resin (A) and the resin (B) within 10% by mole, preferably within 5% by mole, or (4) by using the resins (A) and (B) both having a degree of hydrolysis of at least 60% by mole.

The proportions of the components (A) and (B) included in the resin composition are not particularly limited. The A/B ratio of the amount of the resin (A) to the amount of the resin (B) in the resin composition is preferably from 99/1 to 1/99 by weight, more preferably from 90/10 to 10/90 by weight. If the A/B ratio is less than 1/99 by weight, the weatherability tends to lower, and if the A/B ratio exceeds 99/1 by weight, the image stability is deteriorated due to feathering of the coating layer.

Besides the above-mentioned components (A) and (B), the resin composition of the present invention may contain various known additives, as occasion demands, e.g., an inorganic filler such as synthetic silica, colloidal silica or alumina, a defoaming agent, a releasing agent, a surface active agent such as silicone-based surfactants, fluorine-containing surfactants or polyethylene glycol-based surfactants, a preserving agent, an insecticide, a corrosion inhibitor, and a thickener. Also, the resin composition of the present invention may be incorporated with other agents conventionally used for conversion of paper, e.g., known resins conventionally used for production of coated paper such as other polyvinyl alcohol resins, starch, carboxymethyl cellulose, acrylic resin latex and SBR latex, so long as the effects of the present invention are not impaired.

Examples of the substrates of recording sheets to which the resin composition of the present invention is applied are, for instance, woodfree paper, mechanical paper, (semi-) glassine paper, glossy paper, paper, coated paper (resin-coated paper), synthetic paper, PET film and sheet, PVC film and sheet, and PEN (polyethylene naphthalate) film and sheet. The substrates are not limited thereto, and other papers or synthetic resin films and sheets can be used.

Recording sheets are prepared by coating the resin composition of the present invention onto a recording sheet substrate. The coating can be conducted by any known method, e.g., size press coating, roll coating, air doctor coating, blade coating, and gate roll coating. It is preferable to coat the resin composition in the form of an aqueous solution having a solid concentration of 1 to 70% by weight, especially 2 to 60% by weight, more especially 5 to 50% by weight. If the solid concentration (concentration of resin components) is less than 1% by weight, the coating build-up is small, so the image concentration and surface strength of paper are apt to be low and the practicality is poor. If the solid concentration is more than 70% by weight, the viscosity of a coating liquid becomes high, so the coating operation becomes difficult and uniform coating film is hard to obtain. The amount for coating of the resin composition is from about 0.1 to about 40 $g/m^2$, preferably about 0.5 to about 20 $g/m^2$, on solid basis.

A top coat layer made of a conventional polyvinyl alcohol (partially or completely hydrolyzed polyvinyl acetate) or the like may be further provided, as occasion demands, on the surface of the coating layer of the resin composition according to the present invention.

The thus obtained recording sheets have a good ink receptive layer on the surface of a substrate such as paper or synthetic resin film or sheet, and have an excellent printability (evaluated particularly in respect of ink receptivity, feathering prevention property, gloss, and weatherability) and the like.

The present invention is more specifically described and explained by means of the following Examples in which all parts and % are by weight unless otherwise noted. It is to be understood that the present invention is not limited to the Examples.

In the Examples, evaluation of properties was made according to the following methods.

Transparency

The transparency of an aqueous solution was measured according to JIS K 6726 except that the concentration of the solution was adjusted to 15%.

An aqueous solution having a concentration of 15% was allowed to stand for about 1 hour at 30° C. to remove bubbles on the surface, and put in an absorption cell made of a glass having a thickness of 20 mm. The light transmittance (%) of the test solution relative to that of water was measured at a wavelength of 430 nm. An average value was obtained from triplicate measurements.

Ink Receptivity

A recording sheet obtained in Examples was printed with each color of yellow, cyan and magenta by an ink jet printer (model PM-770C made by Seiko Epson Corporation). After allowing the printed recording sheet to stand at 20° C. and 65% RH for 20 seconds, another non-printed recording sheet was stacked on the printed surface, and thereto was applied a load of 5 $g/cm^2$ for 30 seconds. Transfer of ink to the non-printed sheet was visually observed, and the ink receptivity was evaluated according to the following criteria.

○: No transfer of ink is observed.

Δ: A trace of ink transferred is observed.

X: Transfer of ink is clearly observed.

Feathering

An obtained recording sheet was printed with magenta single color by the same ink jet printer as above. Subsequently lines of about 1 mm in width was printed thereon with cyan color. The degree of feathering at the boundary of the lines was observed by a microscope and evaluated according to the following criteria.

○: The ratio of width of feathering to width of printed line (1 mm) is less than 10%.

Δ: The ratio of width of feathering to width of printed line (1 mm) is from 10 to less than 30%.

X: The ratio of width of feathering to width of printed line (1 mm) is 30% or more.

Gloss

Solid printing of magenta single color was applied to an obtained recording sheet in the same manner as above. After allowing the printed sheet to stand at 20° C. and 65% RH for 72 hours, the gloss of the printed part was measured by an angle-changeable glossmeter (model VG-Σ80 made by Nippon Denshoku Kogyo Kabushiki Kaisha).

Weatherability

Solid printing of magenta single color was applied to an obtained recording sheet by the same ink jet printer as above, and the printed sheet was allowed to stand at 40° C. and 90% RH for 10 days. The print concentration of the printed part was measured by a Macbeth densitometer (model RD914 made by Kollmorgen Corporation). Difference between the print concentrations measured before and after allowing to stand for 10 days was obtained, wherein the print concentration before allowing to stand for 10 days was measured after allowing the printed sheet to stand at 20° C. and 65% RH for 1 hour from the printing.

EXAMPLE 1

An aqueous solution having a solid concentration of 15% was prepared by dissolving in water 60 parts of an oxyalkylene group-containing polyvinyl alcohol resin (A) having an oxyethylene group content of 3% by mole (modified with polyoxyethylene allyl ether having an average chain length n=20, i.e., hydrolyzed copolymer of vinyl acetate and polyoxyethylene allyl ether), a degree of hydrolysis of 85% by mole and an average degree of polymerization of 1,200 and 40 parts of a cationic group-containing polyvinyl alcohol resin (B) having a quaternary ammonium salt group content of 1% by mole (modified with 2,3-dimethyl-1-vinylimidazolinium chloride), a degree of hydrolysis of 82% by mole and an average degree of polymerization of 1,700. The transparency of the resulting solution measured according to JIS K 6726 was 85%.

To the 15% aqueous solution was then added colloidal silica (trade mark "SNOWTEX", made by Nissan Chemical Industries, Ltd.) in an amount of 200 parts per 100 parts of the resin composition (i.e., mixture of the above-mentioned resins (A) and (B)). The resulting resin composition was applied to a woodfree paper having a basis weight of 65 $g/m^2$ in an amount of 10 $g/m^2$ (solid basis) by an applicator, and was dried at 110° C. for 2 minutes to give a recording sheet (a).

The resin composition was also applied to a PET film having a transparency of 96% and a thickness of 100 μm in the same manner as above to give a recording sheet (b).

The properties of the obtained recording sheets (a) and (b) were measured. The results are shown in Table 1.

EXAMPLE 2

An aqueous solution having a solid concentration of 15% was prepared by dissolving in water 85 parts of an oxyalkylene group-containing polyvinyl alcohol resin (A) having an oxyethylene group content of 13% by mole (modified with polyoxyethylene allyl ether having an average chain length n=10), a degree of hydrolysis of 92% by mole and an average degree of polymerization of 600 and 15 parts of a cationic group-containing polyvinyl alcohol resin (B) having a quaternary ammonium salt group content of 4% by mole [modified with trimethyl-(3-acrylamide-3-dimethylpropyl)-ammonium chloride], a degree of hydrolysis of 96% by mole and an average degree of polymerization of 1,400. The transparency of the resulting solution measured according to JIS K 6726 was 88%.

Recording sheets (a) and (b) were then prepared in the same manner as in Example 1 and evaluated.

The results are shown in Table 1.

EXAMPLE 3

An aqueous solution having a solid concentration of 15% was prepared by dissolving in water 25 parts of an oxyalkylene group-containing polyvinyl alcohol resin (A) having an oxyethylene group content of 6% by mole (modified with polyoxyethylene allyl ether having an average chain length n=5), a degree of hydrolysis of 88% by mole and an average degree of polymerization of 1,500 and 75 parts of a cationic group-containing polyvinyl alcohol resin (B) having a quaternary ammonium salt group content of 7% by mole [modified with diallyldimethylammonium chloride], a degree of hydrolysis of 88% by mole and an average degree of polymerization of 1,000. The transparency of the resulting solution measured according to JIS K 6726 was 72%.

Recording sheets (a) and (b) were then prepared in the same manner as in Example 1 and evaluated.

The results are shown in Table 1.

EXAMPLE 4

An aqueous solution having a solid concentration of 15% was prepared by dissolving in water 50 parts of an oxyalkylene group-containing polyvinyl alcohol resin (A) having an oxyethylene group content of 0.7% by mole (modified with polyoxyethylene allyl ether having an average chain length n=15), a degree of hydrolysis of 94% by mole and an average degree of polymerization of 2,700 and 50 parts of a cationic group-containing polyvinyl alcohol resin (B) having a quaternary ammonium salt group content of 0.5% by mole [modified with diallyldimethylammonium chloride], a degree of hydrolysis of 99% by mole and an average degree of polymerization of 2,700. The transparency of the resulting solution measured according to JIS K 6726 was 80%.

Recording sheets (a) and (b) were then prepared in the same manner as in Example 1 and evaluated.

The results are shown in Table 1.

EXAMPLE 5

An aqueous solution having a solid concentration of 15% was prepared by dissolving in water 60 parts of an oxyalkylene group-containing polyvinyl alcohol resin (A) having an oxyethylene group content of 1% by mole (modified with polyoxyethylene allyl ether having an average chain length n=20), a degree of hydrolysis of 99% by mole and an average degree of polymerization of 1,900 and 40 parts of a cationic group-containing polyvinyl alcohol resin (B) having a quaternary ammonium salt group content of 2% by mole [modified with trimethyl-(methacrylamide)-ammonium chloride], a degree of hydrolysis of 91% by mole and an average degree of polymerization of 1,800. The transparency of the resulting solution measured according to JIS K 6726 was 65%.

Recording sheets (a) and (b) were then prepared in the same manner as in Example 1 and evaluated.

The results are shown in Table 1.

EXAMPLE 6

The procedure of Example 1 was repeated except that the ratio of the resin (A) to the resin (B) was changed to A/B=50/50 by weight. The transparency of a 15% aqueous solution of a mixture of the resin (A) and the resin (B) in a weight ratio of 50/50 was 77%. The results of evaluation of recording sheets (a) and (b) are shown in Table 1.

EXAMPLE 7

The procedure of Example 1 was repeated except that the ratio of the resin (A) to the resin (B) was changed to A/B=70/30 by weight. The transparency of a 15% aqueous solution of a mixture of the resin (A) and the resin (B) in a weight ratio of 70/30 was 92%. The results of evaluation of recording sheets (a) and (b) are shown in Table 1.

COMPARATIVE EXAMPLE 1

The procedure of Example 1 was repeated except that the cationic group-containing polyvinyl alcohol resin (B) was not used. The results are shown in Table 1.

COMPARATIVE EXAMPLE 2

The procedure of Example 1 was repeated except that the oxyalkylene group-containing polyvinyl alcohol resin (A) was not used. The results are shown in Table 1.

COMPARATIVE EXAMPLE 3

The procedure of Example 1 was repeated except that a non-modified polyvinyl alcohol having a degree of hydrolysis of 88% by mole and an average degree of polymerization of 1,500 was used instead of the cationic group-containing polyvinyl alcohol resin (B), and the resin (A) and the non-modified polyvinyl alcohol were used in a weight ratio of 50/50. The transparency of a 15% aqueous solution of this mixture was 40%. The results are shown in Table 1.

TABLE 1

| | Ink receptivity | | Feathering | | Gloss | | Weatherability | |
|---|---|---|---|---|---|---|---|---|
| | (a) | (b) | (a) | (b) | (a) | (b) | (a) | (b) |
| Example 1 | ○ | ○ | ○ | ○ | 82 | 88 | ≦0.1 | ≦0.1 |
| Example 2 | ○ | ○ | ○ | ○ | 78 | 84 | ≦0.1 | ≦0.1 |
| Example 3 | ○ | ○ | ○ | ○ | 75 | 82 | ≦0.1 | ≦0.1 |
| Example 4 | ○ | ○ | ○ | ○ | 80 | 89 | ≦0.1 | ≦0.1 |
| Example 5 | ○ | ○ | ○ | ○ | 77 | 86 | ≦0.1 | ≦0.1 |
| Example 6 | ○ | ○ | ○ | ○ | 90 | 82 | ≦0.1 | ≦0.1 |
| Example 7 | ○ | ○ | ○ | ○ | 78 | 91 | ≦0.1 | ≦0.1 |
| Com. Ex. 1 | ○ | ○ | X | X | 72 | 81 | 0.4 | 0.3 |
| Com. Ex. 2 | Δ | Δ | ○ | ○ | 48 | 65 | 0.5 | 0.4 |
| Com. Ex. 3 | ○ | ○ | Δ | Δ | 80 | 62 | 0.3 | 0.3 |

Note:
(a) and (b) denote evaluation of recording sheets (a) and (b).

As understood from the results shown in Table 1, the resin compositions of the present invention can provide recording sheets having an excellent printability such as ink receptivity, feathering prevention property, gloss and weatherability. The resin compositions are applicable to not only paper substrate, but also resin substrates such as PET, PVC and PP films or sheets. The recording sheets obtained according to the present invention are printable by various methods such ink jet printing, offset printing, flexographic printing, and heat-sensitive recording.

What is claimed is:

1. A resin composition for recording sheets, which comprises:

(A) a polyvinyl alcohol resin containing oxyalkylene groups, and (B) a polyvinyl alcohol resin containing cationic groups, wherein a 15% by weight aqueous solution of the mixture of said resin (A) and said resin (B) has a transparency of not less than 50% measured according to JIS K 6726.

2. The composition of claim 1, wherein said cationic group is a quaternary ammonium salt group.

3. The composition of claim 1, wherein said polyvinyl alcohol resin (A) contains 0.2 to 30% by mole of oxyalkylene groups.

4. The composition of claim 1, wherein said polyvinyl alcohol resin (B) contains 0.3 to 10% by mole of cationic groups.

5. The composition of claim 1, wherein difference in degrees of hydrolysis between said resin (A) and said resin (B) is at most 10% by mole.

* * * * *